(12) United States Patent
Kuramochi et al.

(10) Patent No.: US 11,289,257 B2
(45) Date of Patent: Mar. 29, 2022

(54) SOLENOID DEVICE

(71) Applicant: NIDEC TOSOK CORPORATION, Kanagawa (JP)

(72) Inventors: Kenta Kuramochi, Kanagawa (JP); Weiming Chen, Kanagawa (JP); Tomohiro Yasuda, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 466 days.

(21) Appl. No.: 16/441,010

(22) Filed: Jun. 14, 2019

(65) Prior Publication Data

US 2020/0005978 A1    Jan. 2, 2020

(30) Foreign Application Priority Data

Jun. 28, 2018 (JP) .............................. JP2018-122887

(51) Int. Cl.
| | |
|---|---|
| *H01F 3/00* | (2006.01) |
| *H01F 7/08* | (2006.01) |
| *H01F 7/128* | (2006.01) |
| *F16K 11/07* | (2006.01) |
| *F16K 31/06* | (2006.01) |
| *H01F 7/16* | (2006.01) |

(52) U.S. Cl.
CPC .............. *H01F 7/081* (2013.01); *F16K 11/07* (2013.01); *F16K 31/0613* (2013.01); *H01F 7/128* (2013.01); *H01F 7/16* (2013.01); *H01F 2007/086* (2013.01)

(58) Field of Classification Search
CPC . H01F 7/081; H01F 7/128; H01F 7/16; H01F 2007/086; F16K 11/07; F16K 31/0613; F16K 27/048

USPC ......................................................... 335/255
See application file for complete search history.

(56) References Cited

U.S. PATENT DOCUMENTS

| | | | | |
|---|---|---|---|---|
| 6,409,144 B1* | 6/2002 | Inami | ...................... | H01F 7/081 251/129.15 |
| 6,501,359 B2* | 12/2002 | Matsusaka | ............ | H01F 7/1607 29/602.1 |
| 6,619,616 B1* | 9/2003 | Sudani | ................ | F16K 31/0637 137/596.17 |
| 2009/0121817 A1* | 5/2009 | Ishibashi | ............. | F16K 31/0613 335/255 |

(Continued)

FOREIGN PATENT DOCUMENTS

JP    2017166570    9/2017

*Primary Examiner* — Shawki S Ismail
*Assistant Examiner* — Lisa N Homza
(74) *Attorney, Agent, or Firm* — JCIPRNET

(57) ABSTRACT

A solenoid device includes a yoke, a core, a shaft, a bobbin, a coil, a plunger, a lid, and a housing. A housing body part of the housing has a first opening; a first inner wall part expanding toward the outer side in the radial direction on an inner wall; and a first caulking part extending from the rear side end. The first inner wall part has a first step part extending toward the outer side in the radial direction at an end on the other side in the axial direction. A first cylindrical part of the yoke has a first flange part. The first flange part contacts the first step part with an end surface on the other side in the axial direction. The first caulking part is bent toward the inner side in the radial direction to contact a circumferential edge part of the lid.

15 Claims, 2 Drawing Sheets

(56) References Cited

U.S. PATENT DOCUMENTS

| | | | |
|---|---|---|---|
| 2009/0140189 A1* | 6/2009 | Kokubu | F16K 31/0613 |
| | | | 251/129.15 |
| 2010/0301978 A1* | 12/2010 | Ishibashi | H01F 7/1607 |
| | | | 335/255 |
| 2011/0115587 A1* | 5/2011 | Ishibashi | H01F 7/081 |
| | | | 335/255 |
| 2014/0225690 A1* | 8/2014 | Ando | H01F 7/127 |
| | | | 335/255 |
| 2015/0279538 A1* | 10/2015 | Toda | H01F 7/081 |
| | | | 475/31 |
| 2015/0380143 A1* | 12/2015 | Saiki | H01F 7/081 |
| | | | 335/255 |

* cited by examiner

SOLENOID DEVICE

CROSS-REFERENCE TO RELATED APPLICATION

This application claims the priority benefit of Japan Application No. 2018-122887, filed on Jun. 28, 2018. The entirety of the above-mentioned patent application is hereby incorporated by reference herein and made a part of this specification.

BACKGROUND

Technical Field

The disclosure relates to a solenoid device.

Description of Related Art

A solenoid valve, in which a spool valve is provided in a solenoid having a shaft, is known as an example of the solenoid device. The solenoid of the solenoid valve described in Patent Document 1 includes a cylindrical yoke extending in the axial direction; a cylindrical core positioned on the other side in the axial direction with respect to the yoke and extending in the axial direction; a shaft moving in the core in the axial direction; a bobbin disposed on the outer side of the yoke and the core in the radial direction; a coil wound on the bobbin; a plunger moving in the yoke in the axial direction; and a housing that houses these members.

The core has an annular flange part that protrudes in the radial direction on the other side in the axial direction. The flange part is in contact with a first step part provided on the inner wall of the housing, so as to position the core to one side in the axial direction. In addition, the bobbin has an annular protrusion that protrudes toward the outer side in the radial direction at the end on the other side in the axial direction. The protrusion is in contact with a second step part provided on the inner wall of the housing, so as to position the bobbin to one side in the axial direction. A caulking part, which is provided at the end of the housing on the other side in the axial direction, is bent toward the inner side in the radial direction to be in contact with a flange part of the valve body of the spool valve, so as to fix the core and the bobbin inside the housing.

The yoke is coupled to the core via a coupling ring coupled to the end on the other side in the axial direction. A cover plate is disposed opposite to the end on one side of the yoke. A caulking part at the end of the housing on one side in the axial direction is bent toward the inner side in the radial direction to be in contact with the cover plate, so that the cover plate is fixed inside the housing in a state of being held between the caulking part of the housing and the flange part of the yoke. Therefore, the yoke and the core are fixed inside the housing by the caulking parts provided on two sides of the housing in the axial direction.

The solenoid described in Patent Document 1 may have a gap between the flange part of the yoke and the bobbin if the caulking pressure on one side in the axial direction is increased, so the flange part of the yoke may be deformed toward the other side in the axial direction. When the flange part is deformed, the cylindrical part of the yoke that houses the plunger may be deformed and cause the plunger to be unable to move smoothly. In addition, when the caulking pressure on one side in the axial direction is increased, the caulking pressure may be transmitted to the core via the yoke and the connection ring and cause the cylindrical part of the core that houses the shaft to deform. Thus, there is a risk that the shaft cannot move smoothly.

RELATED ART

Patent Document

[Patent Document 1] Japanese Laid-Open No. 2017-166570

SUMMARY

The disclosure provides a solenoid device that prevents deformation of the yoke and the core fixed inside the housing and allows the plunger and the shaft to move smoothly.

Means for Solving the Problems

A first exemplary embodiment of the disclosure is a solenoid device for moving a shaft in an axial direction with a magnetic force generated by excitation of a coil. The solenoid device includes: a yoke including a first cylindrical part that extends in the axial direction; a core positioned on the other side in the axial direction with respect to the yoke and including a second cylindrical part that extends in the axial direction; the shaft moving in the axial direction inside the second cylindrical part; a bobbin disposed on an outer side of the first cylindrical part and the second cylindrical part in a radial direction; the coil wound on the bobbin; a plunger moving in the axial direction inside the first cylindrical part; a lid positioned on one side in the axial direction with respect to the yoke and the plunger; and a housing housing the shaft, the yoke, the core, the bobbin, the coil, the plunger, and the lid. The housing includes a cylindrical housing body part, and the housing body part includes: a first opening that opens at an end on one side in the axial direction; a first inner wall part that is adjacent to the first opening and expands in a cylindrical shape in the axial direction on the outer side in the radial direction on an inner wall of the housing body part on one side in the axial direction; and a first caulking part that extends from an end of the first inner wall part on one side in the axial direction toward one side in the axial direction. The first inner wall part includes an annular first step part that extends in the radial direction at an end on the other side in the axial direction. The first cylindrical part of the yoke includes an annular first flange part that protrudes toward the outer side in the radial direction on one side of the first cylindrical part in the axial direction. An outer diameter of the first flange part is larger than an inner diameter of the inner wall of the housing body part and slightly smaller than an inner diameter of the first inner wall part. The lid has a disk shape, and an outer diameter of the lid is larger than the inner diameter of the inner wall of the housing body part and smaller than the inner diameter of the first inner wall part. The first flange part is in contact with the first step part with a first end surface of the first flange part on the other side in the axial direction. The first caulking part is bent toward an inner side in the radial direction to be in contact with a circumferential edge part of the lid, so that the lid is fixed to the housing with the circumferential edge part in contact with a first end surface of the first flange part on one side in the axial direction.

Effects

According to the first exemplary embodiment of the disclosure, it is possible to provide a solenoid device that prevents deformation of the yoke and the core fixed inside the housing and allows the plunger and the shaft to move smoothly.

DESCRIPTION OF THE EMBODIMENTS

Figure 1:
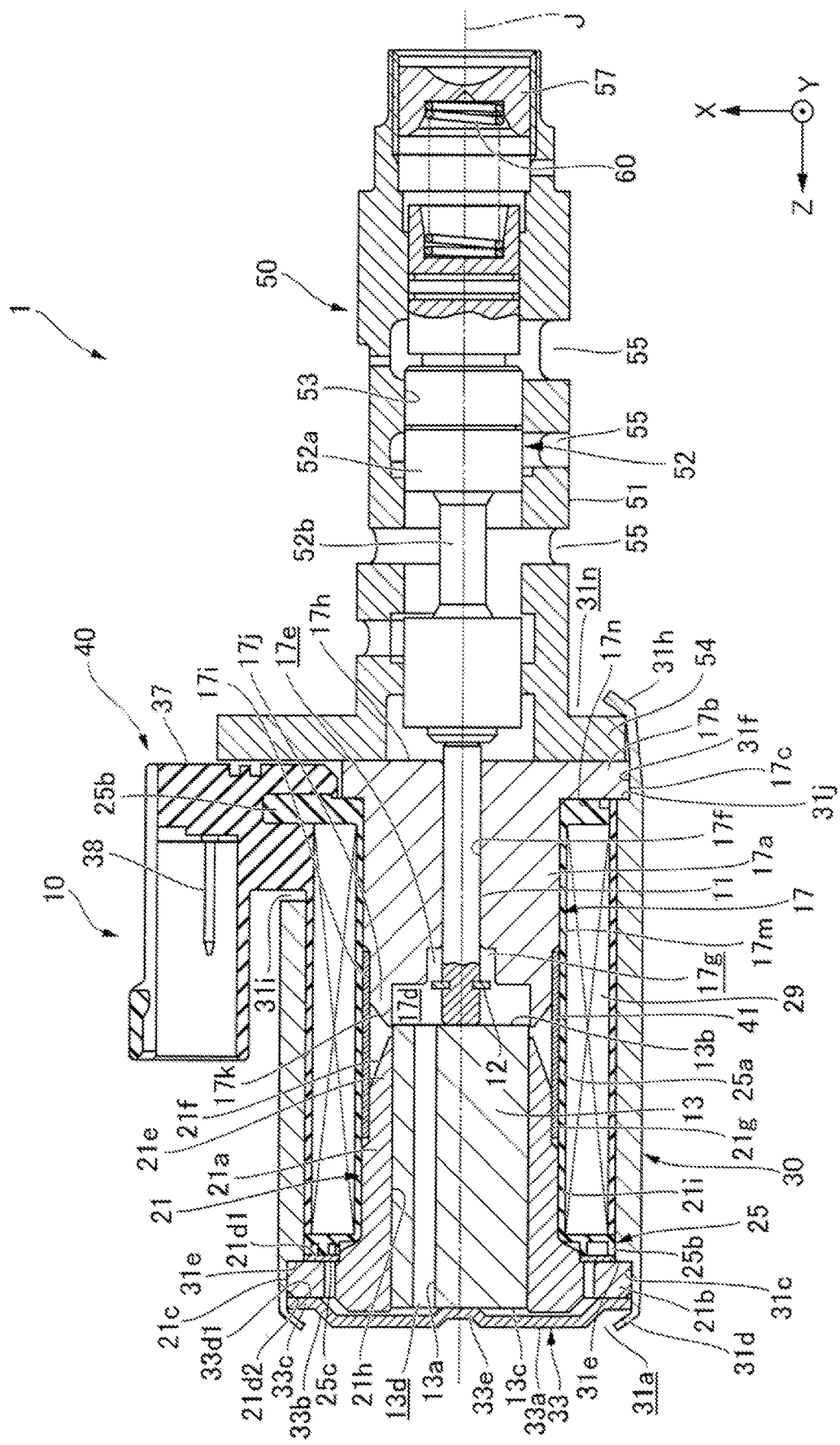
FIG. 1 is a cross-sectional view of the solenoid device according to the first embodiment.

Hereinafter, a solenoid device according to an embodiment of the disclosure will be described with reference to the drawings. The present embodiment illustrates a solenoid device, in which a spool valve for outputting pressure-regulated oil is provided in a solenoid. Moreover, in order to make each configuration easily understandable, in the following drawings, the scale, number, etc. of each structure may be different from the actual structure.

In the drawings, an XYZ coordinate system is shown as a three-dimensional orthogonal coordinate system as appropriate. In the XYZ coordinate system, the Z axis direction is set as a direction parallel to the axial direction of the central axis J shown in FIG. 1. The X axis direction is set as a direction parallel to the lateral direction of the solenoid device shown in FIG. 1. The Y axis direction is set as a direction orthogonal to both the X axis direction and the Z axis direction.

In the following descriptions, the positive side of the Z axis direction (+Z side) is referred to as the "rear side" and the negative side of the Z axis direction (−Z side) is referred to as the "front side". Nevertheless, the rear side and the front side are names used merely for explanation and are not intended to limit the actual positional relationship or direction. In addition, unless otherwise noted, the direction (Z axis direction) parallel to the central axis J is simply referred to as the "axial direction", the radial direction centered on the central axis J is simply referred to as the "radial direction", and the circumferential direction centered on the central axis J, that is, the direction (θ direction) around the central axis J is simply referred to as the "circumferential direction".

In this specification, extension in the axial direction includes not only extension strictly in the axial direction (Z axis direction) but also extension in a direction inclined within a range of less than 45° with respect to the axial direction. In addition, in this specification, extension in the radial direction includes not only extension strictly in the radial direction, that is, a direction perpendicular to the axial direction (Z axis direction) but also extension in a direction inclined within a range of less than 45° with respect to the radial direction.

First Embodiment

<Overall Configuration>

FIG. 1 is a cross-sectional view of a solenoid device according to the first embodiment. As shown in FIG. 1, the solenoid device 1 of the present embodiment includes a solenoid 10 and a spool valve 50. The solenoid 10 and the spool valve 50 are disposed along the axial direction. The solenoid 10 moves a shaft 11 in the axial direction with a magnetic force generated by excitation of a coil 29. The spool valve 50 is positioned on the other side (front side) of the solenoid 10 in the axial direction and includes a spool valve portion 52 that is movable in the axial direction along with movement of the shaft 11. The spool valve portion 52 is movably housed inside a valve body 51. Each component will be described in detail hereinafter. Applying a current to the coil 29 to generate magnetic flux is referred to as "excitation of the coil 29".

<Solenoid 10>

Figure 2:
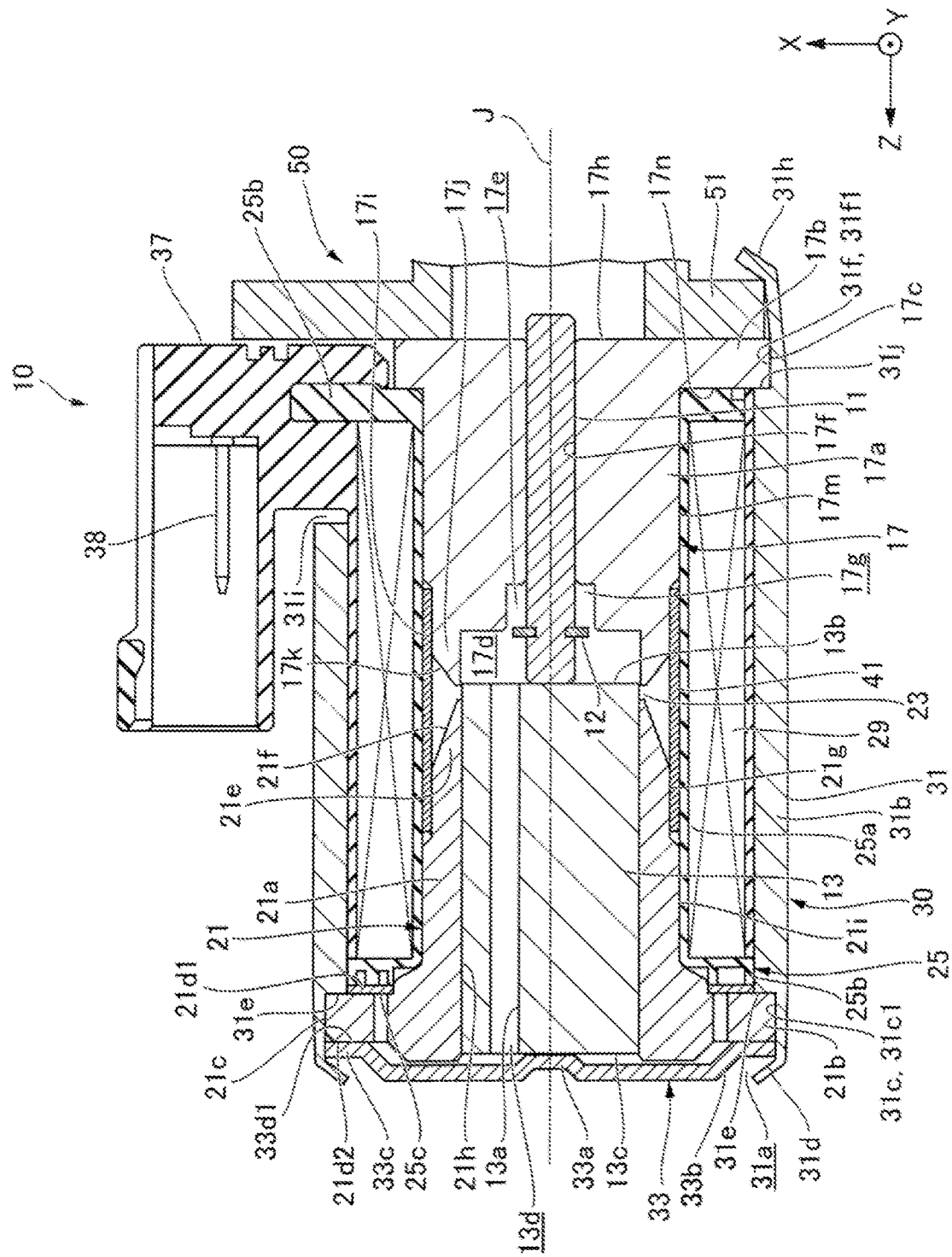
FIG. 2 is a cross-sectional view of the solenoid.

FIG. 2 is a cross-sectional view of the solenoid. As shown in FIG. 1 and FIG. 2, the solenoid 10 includes a yoke 21, a core 17, the shaft 11, a bobbin 25, the coil 29, a plunger 13, a lid 33, and a housing 30.

(Housing 30)

The housing 30 is made of a magnetic metal material and houses the shaft 11, the yoke 21, the core 17, the bobbin 25, the coil 29, the plunger 13, and the lid 33. The housing 30 has a cylindrical housing body part 31. In the present embodiment, the housing body part 31 has a cylindrical shape. The housing body part 31 has a first opening 31a, a first inner wall part 31c, and a first caulking part 31d. The first opening 31a opens at the end on one side in the axial direction. The first inner wall part 31c is adjacent to the first opening 31a and expands in a cylindrical shape in the axial direction on the outer side in the radial direction on an inner wall 31b of the housing body part 31 on one side in the axial direction. The first caulking part 31d extends from the end of the first inner wall part 31c on one side in the axial direction toward one side in the axial direction. The first inner wall part 31c has an annular first step part 31e that extends in the radial direction at the end on the other side in the axial direction.

In the present embodiment, the inner surface of the first inner wall part 31c is flush with the inner surface of the first caulking part 31d. In addition, the thickness of the first caulking part 31d in the radial direction is smaller than the thickness of the inner wall 31b of the housing body part 31 in the radial direction. The first step part 31e extends toward one side in the axial direction in a direction orthogonal to the axial direction. An end surface 21d1 of a first flange part 21b of the yoke 21 on the other side in the axial direction is in contact with the first step part 31e.

The first opening 31a opens on the inner side in the radial direction of a tip end in the axial direction of the first caulking part 31d. The first opening 31a has a circular shape, as viewed in the axial direction. The lid 33 is inserted on the front side of the first opening 31a. A circumferential edge part 33c of the lid 33 is in contact with the first end surface 21d2 of the first flange part 21b on one side in the axial direction.

The housing body part 31 has a second inner wall part 31f that expands in a cylindrical shape in the axial direction on the outer side in the radial direction on the inner wall 31b of the housing body 31, which is adjacent to the end of the bobbin 25 on the other side in the axial direction and extends toward the other side in the axial direction. The second inner wall part 31f has an annular second step part 31j that extends in the radial direction at the end on one side in the axial direction. The inner diameter of the second inner wall part 31f is larger than the inner diameter of the inner wall 31b of the housing body part 31. Therefore, the thickness of the second inner wall part 31f in the radial direction is smaller than the thickness of the inner wall 31b of the housing body part 31 in the radial direction.

The housing body part 31 has a second caulking part 31h that extends from the end on the front side of the second inner wall part 31f toward the front side. The thickness of the second caulking part 31h in the radial direction is the same as the thickness of the second inner wall part 31f in the radial direction. Further, the valve body 51 of the spool valve 50 is fixed to the housing 30 by the second caulking part 31*h*.

A terminal cutout part 31*i* is provided at an end on the plus side in the X axis direction on the front side of the housing body part 31. A terminal body part 37 that holds a terminal 38 electrically connected to the coil 29 protrudes from the inner side of the terminal cutout part 31*i* in the radial direction toward the outer side. The terminal body part 37 and the bobbin 25 on which the coil 29 is wound are an integrally formed product.

(Yoke 21)

The yoke 21 is positioned on the rear side inside the housing body part 31 and has a first cylindrical part 21*a* that extends in the axial direction. In the present embodiment, the first cylindrical part 21*a* has a first through hole 21*h* that penetrates in the axial direction. The plunger 13 is inserted into the first through hole 21*h*.

The annular first flange part 21*b* that protrudes toward the outer side in the radial direction is provided on one side of the first cylindrical part 21*a* in the axial direction. The outer diameter of the first flange part 21*b* is larger than the inner diameter of the inner wall 31*b* of the housing body part 31 and slightly smaller than the inner diameter of the first inner wall part 31*c*. Therefore, the first flange part 21*b* can be easily inserted into the first inner wall part 31*c*. In addition, the first flange part 21*b* is in contact with the first step part 31*e* with the first end surface 21*d*1 of the first flange part 21*b* on the other side in the axial direction.

In the present embodiment, the first flange part 21*b* has an annular shape, and the thickness of the first flange part 21*b* in the axial direction is approximately the same as the thickness of the inner wall 31*b* of the housing body part 31. Therefore, a first circumferential end part 21*c* of the first flange part 21*b* can be easily disposed along the inner surface of the first inner wall part 31*c*. Thus, the yoke 21 can be disposed in a posture along the central axis J. Moreover, the first circumferential end part 21*c* of the first flange part 21*b* on the outer side in the radial direction is in contact with an inner surface 31*c*1 which extends in the circumferential direction on the outer side in the radial direction of the first inner wall part 31*c*.

The first flange part 21*b* is in contact with the first step part 31*e* with the first end surface 21*d*1 of the first flange part 21*b* on the other side in the axial direction. Also, the first end surface 21*d*1 of the first flange part 21*b* on the other side in the axial direction and the end surface 25*c* of the bobbin 25 on the other side in the axial direction are located on the same plane.

As shown in FIG. 2, the length of the first cylindrical part 21*a* in the axial direction is approximately the same as the length of the plunger 13 in the axial direction. The inner diameter of the first through hole 21*h* of the first cylindrical part 21*a* is slightly larger than the outer diameter of the plunger 13. Therefore, the first cylindrical part 21*a* functions as a slide bearing that supports the plunger 13, and allows the plunger 13 to move in the axial direction.

An end of a wall part 21*e* of the first cylindrical part 21*a* on the other side in the axial direction (front side) has an inclined surface part 21*f* that is inclined obliquely toward the inner side in the radial direction as it goes toward the other side in the axial direction. In addition, a cylindrical first fitting part 21*g* that has a smaller diameter than the wall part 21*e* is provided on the wall part 21*e* of the first cylindrical part 21*a* on the other side in the axial direction. A collar 41 (will be described later) is attached to the first fitting part 21*g*.

The first cylindrical part 21*a* and the first flange part 21*b* of the yoke 21 are integrally formed. That is, the first cylindrical part 21*a* and the first flange part 21*b* are made of a single member. The yoke 21 is obtained by die molding or cutting. Nevertheless, the first cylindrical part 21*a* and the first flange part 21*b* of the yoke 21 may be separate members.

(Plunger 13)

The plunger 13 moves in the axial direction inside the first cylindrical part 21*a*. In the present embodiment, the plunger 13 is made of a magnetic material and has a columnar shape. The outer diameter of the plunger 13 is slightly smaller than the inner diameter of the first through hole 21*h* of the first cylindrical part 21*a*.

The plunger 13 has a second through hole 13*a* that penetrates in the axial direction. In the present embodiment, the front side of the second through hole 13*a* opens on the plunger end surface 13*b* on the front side of the plunger 13 and the rear side opens on the plunger end surface 13*c* on the rear side of the plunger 13. The second through hole 13*a* is positioned on the outer side in the radial direction with respect to the shaft 11, as viewed in the axial direction.

(Core 17)

The core 17 is positioned on the other side in the axial direction (front side) with respect to the yoke 21 and has a second cylindrical part 17*a* that extends in the axial direction. The second cylindrical part 17*a* has a third through hole 17*f* that extends in the axial direction for inserting the shaft 11 therein. In the present embodiment, the core 17 is made of a magnetic material and is disposed on the front side of the housing 30 and fixed inside the housing 30. The core 17 is coupled to the yoke 21 via the collar 41 and fixed to the housing 30 in a state of being in contact with the inner surface of the bobbin 25. An annular second flange part 17*b* that protrudes in the radial direction is provided on the front side of the second cylindrical part 17*a* of the core 17. The outer diameter of the second flange part 17*b* is slightly smaller than the inner diameter of the second inner wall part 31*f*.

A second circumferential end part 17*c* of the second flange part 17*b* in the radial direction is in contact with the second inner wall part 31*f*. In the present embodiment, the second circumferential end part 17*c* of the second flange part 17*b* is in contact with the inner surface 31*f*1 which extends in the circumferential direction on the outer side in the radial direction of the second inner wall part 31*f*. Furthermore, a second end surface 17*n* of the second flange part 17*b* on one side in the axial direction is in contact with the second step part 31*j*. Therefore, the core 17 is positioned on one side in the axial direction (rear side) with respect to the housing 30.

A first space 17*d*, which opens on the rear side and is recessed toward the front side, is provided on the rear side of the second cylindrical part 17*a*. In the present embodiment, the first space 17*d* is provided coaxially with the central axis J and has a circular shape, as viewed in the axial direction. The inner diameter of the first space 17*d* is slightly larger than the outer diameter of the plunger 13. Therefore, the plunger 13 is movable in the axial direction inside the first space 17*d*.

The first space 17*d* is provided with an extended space 17*e* that extends from the front side end of the first space 17*d* toward the front side. The extended space 17*e* opens on the rear side and extends toward the front side. The inner diameter of the extended space 17*e* is smaller than the inner diameter of the first space 17*d*. An opening 17*g* on the rear side of the third through hole 17*f*, through which the shaft 11 passes, opens on the bottom surface on the front side of the extended space 17*e*.

The rear side of the third through hole 17*f* communicates with the extended space 17*e* and the front side opens on the end surface 17*h* on the front side of the second cylindrical part 17*a*. The shaft 11 movably passes through the third through hole 17*f*. The third through hole 17*f* functions as a slide bearing that supports the shaft 11, and allows the shaft 11 to move in the axial direction.

The cylindrical collar 41 is inserted between the yoke outer circumferential surface of the yoke 21 on the other side in the axial direction and the core outer circumferential surface of the core 17 on one side in the axial direction. The yoke 21 and the core 17 are coupled via the collar 41 with a gap 23. In the present embodiment, a cylindrical second fitting part 17*i*, which has a diameter smaller than that on the front side of the second cylindrical part 17*a*, is provided on the rear side of the second cylindrical part 17*a* of the core 17.

The front side of the collar 41 is fitted to the second fitting part 17*i*. The rear side of the collar 41 is fitted to the first fitting part 21*g* of the yoke 21. Therefore, the yoke 21 and the core 17 are coupled via the collar 41. The thickness of the collar 41 is smaller than the thickness of the first cylindrical part 21*a* of the yoke 21. In the present embodiment, the thickness of the collar 41 in the radial direction is smaller than the thickness of the first cylindrical part 21*a* of the yoke 21 in the radial direction. Thus, it is possible to enlarge the passage through which the magnetic force lines pass. The collar 41 is made of a non-magnetic material.

A cylindrical thin wall part 17*j* that extends toward the rear side is provided on the outer side of the first space 17*d* of the second cylindrical part 17*a* in the radial direction. The thin wall part 17*j* has an inclined surface part 17*k* that is inclined toward the inner side in the radial direction as it goes toward one side in the axial direction. The thin wall part 17*j* having the inclined surface part 17*k* concentrates the magnetic force lines that extend from the thin wall part 17*j* toward the side of the plunger 13 and increases the force of pulling the plunger 13 toward the front side when the coil 29 is energized.

(Shaft 11)

As shown in FIG. 2, the shaft 11 moves in the axial direction inside the second cylindrical part 17*a*. In the present embodiment, the shaft 11 is made of a non-magnetic metal material, and the outer diameter of the shaft 11 is slightly smaller than the inner diameter of the third through hole 17*f*. An end on the rear side of the shaft 11 protrudes into the first space 17*d*, and an end on the front side of the shaft 11 protrudes from the end surface 17*h* on the front side of the core 17. A retaining ring 12 is attached to the rear side of the shaft 11.

When the plunger 13 moves the shaft 11 toward the front side, before the plunger end surface 13*b* on the front side of the plunger 13 comes into contact with the bottom surface of the first space 17*d*, the retaining ring 12 is at a position in contact with the bottom surface of the extended space 17*e*. Therefore, when the shaft 11 moves toward the front side, the plunger 13 can be prevented from coming into contact with the bottom surface of the first space 17*d*.

(Bobbin 25)

The bobbin 25 has a cylindrical shape and is disposed on the outer side of the first cylindrical part 21*a* and the second cylindrical part 17*a* in the radial direction. In the present embodiment, the bobbin 25 is made of resin and covers a side surface 21*i* of the first cylindrical part 21*a* on the outer side in the radial direction and a side surface 17*m* of the second cylindrical part 17*a* on the outer side in the radial direction. The bobbin 25 has a cylindrical part 25*a*, and a third flange part 25*b* that is provided on two sides of the cylindrical part 25*a* in the axial direction and protrudes toward the outer side in the radial direction. The coil 29 is wound on the cylindrical part 25*a*.

The third flange part 25*b* on the plus side in the X axis direction extends toward the outer side in the radial direction and is connected to the terminal body part 37. The bobbin 25 with the coil 29 wound thereon is integrally molded of resin together with the terminal body part 37.

(Coil 29)

The coil 29 is wound on the bobbin 25. In the present embodiment, the coil 29 is wound in the circumferential direction along the outer circumferential surface of the cylindrical part 25*a* of the bobbin 25 on the outer side in the radial direction. Two ends of the coil 29 are electrically connected to the terminal 38 provided in the terminal body part 37.

(Lid 33)

As shown in FIG. 2, the lid 33 is made of a non-magnetic material and is positioned on one side in the axial direction (rear side) with respect to the yoke 21 and the plunger 13. The lid 33 has a disk shape. The outer diameter of the lid 33 is larger than the inner diameter of the inner wall 31*b* of the housing body part 31 and slightly smaller than the inner diameter of the first inner wall part 31*c*. Moreover, the first caulking part 31*d* is bent toward the inner side in the radial direction to be in contact with the circumferential edge part 33*c* of the lid 33, so that the lid 33 is fixed to the housing 30 with the circumferential edge part 33*c* in contact with the first end surface 21*d*2 of the first flange part 21*b* on one side in the axial direction.

In the present embodiment, the lid 33 has a lid body part 33*a* disposed opposite to the plunger end surface 13*c* of the plunger 13 on one side in the axial direction; an annular inclined part 33*b* extending from the end of the lid body part 33*a* on the outer side in the radial direction toward the outer side in the radial direction as it goes toward the other side in the axial direction; and the annular circumferential edge part 33*c* protruding from the end of the inclined part 33*b* on the outer side in the radial direction toward the outer side in the radial direction. The lid 33 closes the first opening 31*a* in a state of being fixed to the housing 30.

The lid body part 33*a* has a protrusion 33*e* that protrudes toward the side of the plunger on the inner side of the lid body part 33*a* in the radial direction. In the present embodiment, the protrusion 33*e* is in contact with the central part of the plunger end surface 13*c* on the rear side of the plunger 13 and is disposed at a position that deviates toward the side of the central axis J with respect to the opening 13*d* on the rear side of the second through hole 13*a*.

<Spool Valve 50>

(Valve Body 51)

As shown in FIG. 1, the valve body 51 has a cylindrical shape and has a plurality of ports 55 through which oil flows in or out. The valve body 51 has a spool hole 53 that extends in the axial direction for inserting the spool valve portion 52. The spool hole 53 penetrates the valve body 51 in the axial direction. A plurality of ports 55 are connected to the spool hole 53. A flange part 54 that protrudes in the radial direction is provided at the rear side end of the valve body 51. The flange part 54 is caulked by the second caulking part 31*h* provided on the housing body part 31 of the solenoid 10 to be fixed to the housing body part 31.

(Spool Valve Portion 52)

The spool valve portion 52 includes a plurality of large diameter parts 52a each having an outer diameter slightly smaller than the inner diameter of the spool hole 53, and a small diameter part 52b that connects the large diameter parts 52a adjacent to each other in the axial direction and has a smaller diameter than the large diameter parts 52a. By moving the spool valve portion 52 in the axial direction, the large diameter parts 52a open and close the ports 55. A closing member 57 for closing the opening on the front side of the spool hole 53 is inserted into the end on the front side of the valve body 51. A compression spring 60 is disposed between the closing member 57 and the front side end of the spool valve portion 52. Therefore, the spool valve portion 52 is urged toward the rear side by the compression spring 60.

<Method of Assembling the Solenoid 10>

First, as shown in FIG. 1, the yoke 21 is inserted into the housing body part 31 from the first opening 31a that opens on the rear side of the housing body part 31 with the first flange part 21b facing the rear side, and the first end surface 21d1 of the first flange part 21b on the other side in the axial direction is brought into contact with the first step part 31e of the housing body part 31.

After the yoke 21 is inserted, the lid 33 is inserted into the housing body part 31 from the first opening 31a with the protrusion 33e facing the front side. The surface 33d1 on the front side of the circumferential edge part 33c of the lid 33 comes into contact with the first end surface 21d2 on one side in the axial direction on the rear side of the first flange part 21b of the yoke 21. After the lid 33 is inserted, the first caulking part 31d is bent toward the inner side in the radial direction to be in contact with the circumferential edge part 33c of the lid 33, so as to fix the lid 33 to the housing body part 31.

After the lid 33 is fixed, the plunger 13 is inserted into the housing body part 31 from the second opening 31n that opens on the front side of the housing body part 31, and the plunger 13 is inserted into the first through hole 21h of the first cylindrical part 21a of the yoke 21. After the plunger 13 is inserted, the collar 41 is inserted into the housing body part 31 from the second opening 31n and fitted to the first fitting part 21g of the yoke 21.

After the collar 41 is inserted, an assembly 40 obtained by integrating the bobbin 25 and the terminal body part 37 is inserted into the housing body part 31 from the second opening 31n. The bobbin 25 is fixed by fitting the outer circumferential surface of the bobbin 25 to the inner surface of the inner wall 31b of the housing body part 31.

After the assembly 40 is inserted, the core 17 with the shaft 11 inserted therein is inserted into the housing body part 31 from the second opening 31n with the first space 17d facing the rear side, and the collar 41 that extends from the yoke 21 toward the front side is fitted to the second fitting part 17i of the core 17. In addition, the second end surface 17n on one side in the axial direction of the second flange part 17b of the core 17 is brought into contact with the second step part 31j of the housing body part 31, so as to complete the assembly of the solenoid 10.

Nevertheless, the assembling method of the solenoid 10 is not limited to the order described above. In the assembling method described above, the assembly 40 is inserted into the housing body part 31 after the plunger 13 is inserted into the yoke 21. However, the plunger 13 may be inserted into the yoke 21 after the assembly 40 is inserted into the housing body part 31.

<Operation and Effect of the Solenoid Device 1>

Next, the operation and effect of the solenoid device 1 will be described. As shown in FIG. 1, when the coil 29 of the solenoid 10 of the solenoid device 1 is excited, the plunger 13 is attracted toward the side of the core 17 by the magnetic force generated in the coil 29. Therefore, the shaft 11 in contact with the plunger 13 moves toward the front side together with the plunger 13. In addition, when the shaft 11 moves, it moves against the urge of the compression spring 60. Thus, the spool valve portion 52 in contact with the shaft 11 moves toward the front side.

On the other hand, when the coil 29 of the solenoid 10 is in the non-excitation state, the plunger 13 loses the attraction force from the core 17. Therefore, the spool valve portion 52 is moved toward the rear side by the urging force of the compression spring 60 that is directed to the front side. In addition, along with the movement of the spool valve portion 52 toward the rear side, the shaft 11 and the plunger 13 of the solenoid 10 move toward the rear side.

(1) Here, in the solenoid device 1 according to the present embodiment, the first flange part 21b of the yoke 21 is in contact with the first step part 31e with the first end surface 21d1 on the other side in the axial direction, and the first caulking part 31d is bent toward the inner side in the radial direction to be in contact with the circumferential edge part 33c of the lid 33, so that the lid 33 is fixed to the housing 30 with the circumferential edge part 33c in contact with the first end surface 21d2 of the first flange part 21b on one side in the axial direction. Therefore, the caulking pressure of the first caulking part 31d acts on the first step part 31e of the housing 30 via the circumferential edge part 33c of the lid 33 and the first flange part 21b of the yoke 21. Therefore, it is possible to prevent deformation of the yoke 21.

(2) Furthermore, the first circumferential end part 21c of the first flange part 21b on the outer side in the radial direction is in contact with the inner surface 31c1 of the first inner wall part 31c. Therefore, the permeability of the magnetic force lines from the first flange part 21b to the housing 30 can be improved, and dispersion of the magnetic circuit in the solenoid device 1 can be suppressed.

(3) Also, the first end surface 21d1 on the other side in the axial direction of the first flange part 21b of the yoke 21 is in contact with the end surface 25c of the bobbin 25 on one side in the axial direction. Therefore, the permeability of the magnetic force lines passing from the coil 29 through the first flange part 21b can be improved.

(4) Further, the first end surface 21d1 of the first flange part 21b on the other side in the axial direction and the end surface 25c of the bobbin 25 on one side in the axial direction are located on the same plane. Therefore, it is possible to suppress the caulking pressure from acting on the bobbin 25.

(5) Also, the lid 33 closes the first opening 31a in a state of being fixed to the housing 30. Therefore, the magnetic force lines passing through the plunger 13 or the yoke 21 can be prevented from leaking to the outside from the first opening 31a.

(6) In addition, the lid 33 is made of a non-magnetic material. Therefore, the magnetic force lines that return to the coil 29 through the yoke 21 from the plunger 13 are unlikely to pass through the lid 33. Therefore, it is possible to suppress dispersion of the magnetic circuit.

(7) Moreover, the first cylindrical part 21a and the first flange part 21b of the yoke 21 are integrated. Therefore, the number of parts can be reduced as compared with the case where the first cylindrical part 21a and the first flange part 21b of the yoke 21 are separate members.

(8) Furthermore, the lid 33 has the lid body part 33a disposed opposite to the plunger end surface 13c; the annular inclined part 33b extending from the end of the lid body part 33a on the outer side in the radial direction toward the outer side in the radial direction as it goes toward the other side in the axial direction; and the annular circumferential edge part 33c protruding from the end of the inclined part 33b on the outer side in the radial direction toward the outer side in the radial direction. Therefore, the lid body part 33a is positioned on one side in the axial direction with respect to the circumferential edge part 33c. Thus, the plunger 13 can be disposed close to the side of the lid body part 33a, and the size of the solenoid device 1 in the axial direction can be prevented from increasing.

(9) In addition, the lid body part 33a has the protrusion 33e that protrudes toward the side of the plunger on the inner side of the lid body part 33a in the radial direction. Therefore, when the plunger 13 moves toward one side in the axial direction, the plunger end surface 13c of the plunger 13 on one side in the axial direction can come into contact with the protrusion 33e to restrict movement of the plunger 13 toward one side in the axial direction.

(10) Also, the second flange part 17b is in contact with the second step part 31j with the second end surface 17n on one side in the axial direction. Therefore, one side of the core 17 in the axial direction can be positioned with respect to the housing 30.

(11) Furthermore, the second circumferential end part 17c of the second flange part 17b on the outer side in the radial direction is in contact with the inner surface 31f1 of the second inner wall part 31f. Therefore, the permeability of the magnetic force lines from the second flange part 17b to the housing 30 can be improved, and dispersion of the magnetic circuit in the solenoid device 1 can be further suppressed.

(12) In addition, the yoke 21 and the core 17 are coupled via the collar 41 with the gap 23. Therefore, the yoke 21 and the core 17 can be integrated via the collar 41.

(13) Further, the thickness of the collar 41 is smaller than the thickness of the first cylindrical part 21a of the yoke 21. As described above, the caulking pressure of the first caulking part 31d acts on the first step part 31e of the housing 30 via the circumferential edge part 33c of the lid 33 and the first flange part 21b of the yoke 21. Since the caulking pressure does not act on the collar 41 via the yoke 21, the thickness of the collar 41 can be reduced. Accordingly, by making the collar 41 thinner than the first cylindrical part 21a of the yoke 21, the thickness of the yoke 21 and the core 17 in the radial direction can be increased to expand the passage of the magnetic force lines.

(14) Moreover, the collar 41 is made of a non-magnetic material. Therefore, it is possible to block the passage of the magnetic force lines that pass from the core 17 to the side of the yoke 21 via the collar 41.

(15) In addition, the other side of the yoke 21 in the axial direction is provided with the inclined surface part 21f that is inclined toward the inner side in the radial direction as it goes toward the other side in the axial direction. Therefore, the space between one end of the core 17 in the axial direction and the other end of the yoke 21 in the axial direction can be expanded as compared with the case where the end of the yoke 21 on the other side in the axial direction is a surface extending in the radial direction. Thus, it is possible to further reduce the possibility that part of the magnetic force lines passing from the core 17 to the side of the plunger 13 are dispersed to the side of the yoke 21.

Although exemplary embodiments of the disclosure have been described above, the disclosure is not limited to these embodiments, and it is possible to make various modifications and changes within the scope of the disclosure. These embodiments and modifications thereof are included in the scope of the disclosure as well as in the scope of the disclosure defined in the claims and its equivalent.

What is claimed is:

1. A solenoid device for moving a shaft in an axial direction with a magnetic force generated by excitation of a coil, the solenoid device comprising:
    a yoke comprising a first cylindrical part that extends in the axial direction;
    a core positioned on the other side in the axial direction with respect to the yoke and comprising a second cylindrical part that extends in the axial direction;
    the shaft moving in the axial direction inside the second cylindrical part;
    a bobbin disposed on an outer side of the first cylindrical part and the second cylindrical part in a radial direction;
    the coil wound on the bobbin;
    a plunger moving in the axial direction inside the first cylindrical part;
    a lid positioned on one side in the axial direction with respect to the yoke and the plunger; and
    a housing housing the shaft, the yoke, the core, the bobbin, the coil, the plunger, and the lid,
    wherein the housing comprises a cylindrical housing body part, and
    the housing body part comprises:
    a first opening that opens at an end on one side in the axial direction;
    a first inner wall part that is adjacent to the first opening and expands in a cylindrical shape in the axial direction on the outer side in the radial direction on an inner wall of the housing body part on one side in the axial direction; and
    a first caulking part that extends from an end of the first inner wall part on one side in the axial direction toward one side in the axial direction,
    wherein the first inner wall part comprises an annular first step part that extends in the radial direction at an end on the other side in the axial direction,
    the first cylindrical part of the yoke comprises an annular first flange part that protrudes toward the outer side in the radial direction on one side of the first cylindrical part in the axial direction,
    an outer diameter of the first flange part is larger than an inner diameter of the inner wall of the housing body part and slightly smaller than an inner diameter of the first inner wall part,
    the lid has a disk shape, and an outer diameter of the lid is larger than the inner diameter of the inner wall of the housing body part and smaller than the inner diameter of the first inner wall part,
    the first flange part is in contact with the first step part with a first end surface of the first flange part on the other side in the axial direction, and
    the first caulking part is bent toward an inner side in the radial direction to be in contact with a circumferential edge part of the lid, so that the lid is fixed to the housing with the circumferential edge part in contact with a first end surface of the first flange part on one side in the axial direction.

2. The solenoid device according to claim 1, wherein the first flange part is further in contact with an inner surface of the first inner wall part with a first circumferential end part of the first flange part on the outer side in the radial direction.

3. The solenoid device according to claim 1, wherein the bobbin has a cylindrical shape, and
the first end surface on the other side in the axial direction of the first flange part of the yoke is in contact with an end surface of the bobbin on one side in the axial direction.

4. The solenoid device according to claim 3, wherein the first end surface of the first flange part on the other side in the axial direction and the end surface of the bobbin on one side in the axial direction are located on the same plane.

5. The solenoid device according to claim 1, wherein the lid closes the first opening in a state of being fixed to the housing.

6. The solenoid device according to claim 5, wherein the lid is made of a non-magnetic material.

7. The solenoid device according to claim 1, wherein the first cylindrical part and the first flange part of the yoke are integrated.

8. The solenoid device according to claim 1, wherein the lid comprises:
a lid body part disposed opposite to a plunger end surface of the plunger on one side in the axial direction;
an annular inclined part extending from an end of the lid body part on the outer side in the radial direction toward the outer side in the radial direction as the inclined part goes toward the other side in the axial direction; and
the annular circumferential edge part protruding from an end of the inclined part on the outer side in the radial direction toward the outer side in the radial direction.

9. The solenoid device according to claim 8, wherein the lid body part comprises a protrusion that protrudes toward the side of the plunger on the inner side of the lid body part in the radial direction.

10. The solenoid device according to claim 1, wherein the housing body part comprises a cylindrical second inner wall part that expands in the axial direction on the outer side in the radial direction on the inner wall of the housing body part, which is adjacent to an end of the bobbin on the other side in the axial direction and extends toward the other side in the axial direction,
the second inner wall part comprises an annular second step part that extends in the radial direction at an end on one side in the axial direction,
the core comprises an annular second flange part that protrudes in the radial direction on one side of the core in the axial direction,
an outer diameter of the second flange part is slightly smaller than an inner diameter of the second inner wall part, and
the second flange part is in contact with the second step part with a second end surface of the second flange part on one side in the axial direction.

11. The solenoid device according to claim 10, wherein the second flange part is further in contact with an inner surface of the second inner wall part with a second circumferential end part of the second flange part on the outer side in the radial direction.

12. The solenoid device according to claim 10, wherein a cylindrical collar is inserted between a yoke outer circumferential surface of the yoke on the other side in the axial direction and a core outer circumferential surface of the core on one side in the axial direction, and
the yoke and the core are coupled via the collar with a gap.

13. The solenoid device according to claim 12, wherein a thickness of the collar is smaller than a thickness of the first cylindrical part of the yoke.

14. The solenoid device according to claim 12, wherein the collar is made of a non-magnetic material.

15. The solenoid device according to claim 14, wherein the other side of the yoke in the axial direction is provided with an inclined surface part that is inclined toward the inner side in the radial direction as the inclined surface part goes toward the other side in the axial direction.

* * * * *